United States Patent
Terada et al.

(10) Patent No.: US 12,473,229 B2
(45) Date of Patent: Nov. 18, 2025

(54) REINFORCED GLASS CONTAINER, METHOD FOR PRODUCING PHARMACEUTICAL CONTAINER, AND METHOD FOR PRODUCING REINFORCED GLASS CONTAINER

(71) Applicant: AGC INC., Tokyo (JP)

(72) Inventors: Tatsuya Terada, Tokyo (JP); Mai Nishi, Tokyo (JP); Tomoya Hosoda, Tokyo (JP)

(73) Assignee: AGC INC., Tokyo (JP)

( * ) Notice: Subject to any disclaimer, the term of this patent is extended or adjusted under 35 U.S.C. 154(b) by 156 days.

(21) Appl. No.: 18/217,690

(22) Filed: Jul. 3, 2023

(65) Prior Publication Data

US 2023/0339805 A1 Oct. 26, 2023

Related U.S. Application Data

(63) Continuation of application No. PCT/JP2021/048886, filed on Dec. 28, 2021.

(30) Foreign Application Priority Data

Jan. 8, 2021 (JP) ................................. 2021-002416

(51) Int. Cl.
| | |
|---|---|
| *A61J 1/06* | (2006.01) |
| *A61J 1/14* | (2023.01) |
| *B65D 23/08* | (2006.01) |
| *C03C 17/00* | (2006.01) |
| *C03C 17/32* | (2006.01) |
| *C08F 214/26* | (2006.01) |
| *C09D 127/18* | (2006.01) |

(52) U.S. Cl.
CPC ............... *C03C 17/32* (2013.01); *A61J 1/06* (2013.01); *A61J 1/065* (2013.01); *A61J 1/1468* (2015.05); *B65D 23/0821* (2013.01); *C03C 17/005* (2013.01); *C08F 214/262* (2013.01); *C09D 127/18* (2013.01)

(58) Field of Classification Search
CPC ............... C09D 127/18; C08F 214/26; C08F 216/1408; C08F 222/04

USPC ................................. 428/34.1–36.92
See application file for complete search history.

(56) References Cited

U.S. PATENT DOCUMENTS

| | | | | |
|---|---|---|---|---|
| 2008/0081139 A1* | 4/2008 | Iwahara | ............... | B32B 27/34 |
| | | | | 428/36.6 |
| 2015/0136723 A1* | 5/2015 | Bamba | ............... | B65D 1/0215 |
| | | | | 215/12.2 |
| 2015/0360999 A1* | 12/2015 | Fadeev | ............... | C03C 17/30 |
| | | | | 428/34.7 |
| 2017/0130009 A1* | 5/2017 | Hosoda | ............... | B32B 27/08 |
| 2018/0214875 A1* | 8/2018 | Miles | ............... | B01L 3/52 |
| 2019/0100635 A1* | 4/2019 | Hosoda | ............... | B32B 15/20 |
| 2019/0144700 A1* | 5/2019 | Hosoda | ............... | H05K 3/285 |
| | | | | 216/13 |

FOREIGN PATENT DOCUMENTS

| | | | | |
|---|---|---|---|---|
| JP | H09-206606 A | | 8/1997 | |
| JP | 2010053209 A | * | 3/2010 | |
| JP | 2015096572 A | | 5/2015 | |
| JP | 2015515433 A | | 5/2015 | |
| JP | 2019183005 A | * | 10/2019 | |
| WO | WO-2018199034 A1 | * | 11/2018 | ............ A61K 31/70 |
| WO | WO-2018212285 A1 | * | 11/2018 | ............ B32B 15/04 |
| WO | WO-2019031521 A1 | | 2/2019 | |
| WO | WO-2020004384 A1 | * | 1/2020 | ............ B32B 15/08 |
| WO | WO-2020137828 A1 | | 7/2020 | |

OTHER PUBLICATIONS

International Search Report issued Mar. 8, 2022 in PCT/JP2021/048886 (with English translation), 4 pages.

* cited by examiner

*Primary Examiner* — Michael C. Romanowski
(74) *Attorney, Agent, or Firm* — Element IP, PLC

(57) ABSTRACT

To provide a reinforced glass container which has impact resistance and which can be used for treatment involving exposure to high temperatures or ultraviolet irradiation.
The reinforced glass container of the present invention comprises a glass container and a polymer layer provided on the outer surface of the glass container and having a thickness of more than 1 μm, wherein the polymer layer contains a tetrafluoroethylene type polymer having a melting temperature of more than 260° C. and having carbonyl group-containing groups or hydroxy group-containing groups.

13 Claims, No Drawings

REINFORCED GLASS CONTAINER, METHOD FOR PRODUCING PHARMACEUTICAL CONTAINER, AND METHOD FOR PRODUCING REINFORCED GLASS CONTAINER

TECHNICAL FIELD

The present invention relates to a reinforced glass container, a method for producing a pharmaceutical container, and a method for producing a reinforced glass container.

BACKGROUND ART

A glass container is excellent in chemical resistance, airtightness, transparency, etc. For this reason, a glass container is useful as a container to be used to store pharmaceutical products and is widely used as an ampoule and a vial. However, glass is easily broken by impact, and a glass container is likely to be easily damaged by transport or contact at the time of filling the content. Therefore, a method of improving the impact resistance of the glass container by providing a polymer layer on the outer surface of the glass container, has been adopted, but it is not easy to firmly adhere the glass to the polymer layer.

In Patent Document 1, a glass container is proposed, in which a primer layer is formed on the outer surface by using a silane coupling agent and further a polymer layer is formed on the above primer layer.

Further, in Patent Document 2, a glass container is proposed, in which an undercoat layer made of a copolymer (FEP) of tetrafluoroethylene and hexafluoropropylene is formed on the outer surface and further, a topcoat layer made of a fluoroolefin type polymer is formed on the above undercoat layer.

PRIOR ART DOCUMENTS

Patent Documents

Patent Document 1: JP-A-2015-515433
Patent Document 2: JP-A-H9-206606

DISCLOSURE OF INVENTION

Technical Problem

In recent years, there have been an increasing number of cases where a high level of hygiene management is required for glass containers, and, for example, glass containers to be used to contain pharmaceutical products are often subjected to sterilization treatment by prolonged exposure to high temperatures or ultraviolet irradiation. However, the present inventors have found that the glass containers disclosed in Patent Documents 1 and 2 are not sufficient as glass containers to meet these requirements.

Specifically, the glass container disclosed in Patent Document 1 has a problem that the original impact resistance is still inadequate. In addition, along with the degradation of the primer layer or polymer layer due to exposure to high temperatures or ultraviolet irradiation, not only the impact resistance will be further reduced, but also there will be a problem that the polymer layer itself is prone to peeling off.

The glass container disclosed in Patent Document 2 has a problem that the adhesion between the outer surface and the coating layer is still insufficient, and the coating layer melts when exposed to high temperatures, whereby it is impossible to fully apply the sterilization treatment itself.

As a result of diligent studies, the present inventors have found that if a specified tetrafluoroethylene type polymer layer is provided on the outer surface of a glass container, it is possible to obtain a reinforced glass container which is provided with impact resistance and which can be used for treatment involving exposure to high temperatures or ultraviolet irradiation.

The purpose of the present invention is to provide such a reinforced glass container and a method for its production, and to provide a method for producing a pharmaceutical container using such a reinforced glass container.

Solution to Problem

The present invention has the following embodiments.
[1] A reinforced glass container comprising a glass container and a polymer layer provided on the outer surface of the glass container and having a thickness of more than 1 μm, wherein the polymer layer contains a tetrafluoroethylene type polymer having a melting temperature of more than 260° C. and having carbonyl group-containing groups or hydroxy group-containing groups.
[2] The reinforced glass container according to [1], wherein the compressive strength of the tetrafluoroethylene type polymer is more than 12 MPa.
[3] The reinforced glass container according to [1] or [2], wherein the tetrafluoroethylene type polymer is a tetrafluoroethylene type polymer having from 10 to 5000 carbonyl group-containing groups per $1 \times 10^6$ carbon atoms in the main chain.
[4] The reinforced glass container according to any one of [1] to [3], wherein the tetrafluoroethylene type polymer is a tetrafluoroethylene type polymer containing units based on a perfluoro(alkyl vinyl ether).
[5] The reinforced glass container according to any one of [1] to [4], wherein the glass container is made of borosilicate glass or alkali aluminosilicate glass.
[6] The reinforced glass container according to any one of [1] to [5], wherein the thickness of the glass container is at most 2 mm.
[7] The reinforced glass container according to any one of [1] to [6], wherein the polymer layer further contains polytetrafluoroethylene.
[8] The reinforced glass container according to any one of [1] to [7], wherein the thickness of the polymer layer is more than 20 μm.
[9] The reinforced glass container according to any one of [1] to [8], wherein the thickness of the polymer layer is less than 40 μm.
[10] The reinforced glass container according to any one of [1] to [9], wherein the glass container is a vial, an ampoule, a bottle or a cartridge.
[11] The reinforced glass container according to any one of [1] to [10], which is for pharmaceutical products.
[12] A method of producing a pharmaceutical container, which comprises exposing a reinforced glass container as defined in any one of [1] to [11] to ultraviolet light or an atmosphere at a temperature of at least 200° C. and below the melting temperature of the tetrafluoroethylene type polymer, to obtain the reinforced glass container which has been sterilized, filling the reinforced glass container with a pharmaceutical product, followed by sealing to obtain a pharmaceutical container having the pharmaceutical product stored in the reinforced glass container.

[13] A method for producing a reinforced glass container, which comprises applying a liquid composition containing particles of a tetrafluoroethylene type polymer having a melting temperature of more than 260° C. and having carbonyl group-containing groups or hydroxy group-containing groups, to the outer surface of a glass container, followed by heating to form a polymer layer containing the tetrafluoroethylene type polymer and having a thickness of more than 1 μm, to obtain a reinforced glass container comprising the glass container and the polymer layer formed on the outer surface of the glass container.

[14] The production method according to [13], wherein the liquid composition is applied to the outer surface of the glass container by a dip coating method.

[15] The production method according to [13] or [14], wherein the viscosity of the liquid composition is at most 1000 mPa·s.

Advantageous Effects of Invention

According to the present invention, it is possible to obtain a reinforced glass container excellent in impact resistance, heat resistance and UV resistance and to efficiently produce a container for pharmaceuticals, etc., for which a high level of hygiene management is required.

DESCRIPTION OF EMBODIMENTS

The following terms have the following meanings.

The "average particle diameter (D50)" is the cumulative 50% diameter of the object (particles or filler) on a volume basis, as determined by the laser diffraction/scattering method. That is, the particle size distribution is measured by the laser diffraction/scattering method, the cumulative curve is obtained by taking the total volume of the particle population as 100%, and it is the particle diameter at the point where the cumulative volume becomes 50% on the cumulative curve.

The "melting temperature" is the temperature corresponding to the maximum value of the melting peak of the polymer as measured by the differential scanning calorimetry (DSC) method.

The "glass transition temperature (Tg)" is a value measured by analyzing the polymer by the dynamic viscoelasticity measurement (DMA) method.

The "viscosity" is the viscosity of the liquid composition measured by using a Type B viscometer at 25° C. under a condition of a rotation speed of 60 rpm. The measurement is repeated three times, and the average value of the three measurements is taken.

The "thixotropic ratio" is a value calculated by dividing the viscosity of the liquid composition measured at a rotation speed of 30 rpm by the viscosity of the liquid composition measured at a rotation speed of 60 rpm. Each viscosity measurement is repeated three times, and the average value of the three measurements is taken.

The "specific surface area" is a value calculated by measuring particles or fillers by the gas adsorption (constant volume method) BET multipoint method, and is determined by using NOVA4200e (Quantachrome Instruments).

The term "unit" in a polymer means an atomic group formed directly from a single monomer molecule by polymerization, as well as an atomic group resulting from the conversion of a portion of the above atomic group into another structure by treating the formed polymer. Hereafter, units based on monomer a will be simply referred to also as "monomer a units".

The reinforced glass container of the present invention (hereinafter referred to also as "the present container") comprises a glass container and a polymer layer (hereinafter referred to also as "F layer") provided on the outer surface of the glass container and having a thickness of more than 1 μm. And, the F layer contains a tetrafluoroethylene type polymer (hereinafter referred to also as "F polymer") having a melting temperature of more than 260° C. and having carbonyl group-containing groups or hydroxy group-containing groups.

The present container is excellent in impact resistance, heat resistance and UV resistance. The reasons for this are not necessarily clear, but are considered to be as follows.

The F polymer in the present container is a heat resistant and UV durable fluoropolymer with a melting temperature of more than 260° C. This enhances the shape retention of the F layer when exposed to a high-temperature atmosphere or UV rays.

It can also be said that the F polymer with the melting temperature has a certain plasticity and elasticity, and thus is rich in flexibility. Therefore, the impact resistance of the present container is improved by forming the F layer to have at least a predetermined thickness.

Further, the F polymer has carbonyl group-containing groups or hydroxy group-containing groups, which interact with polar functional groups such as silanol groups on the outer surface of the glass container, whereby the outer surface and the F polymer are firmly bonded.

It is considered that as these effects function synergistically, it has been possible to obtain a reinforced glass container which is excellent in impact resistance and can be used for treatment involving exposure to high temperatures and ultraviolet irradiation.

The F layer in the present container is preferably provided directly on the outer surface of the glass container. In other words, the present container comprises a glass container and an F layer provided directly on the outer surface of the glass container, and it is preferred that the F layer is a glass container containing the F polymer. In such a case, the above-mentioned mechanism of action becomes prominent, and the impact resistance, heat resistance and UV resistance of the present container are likely to be further improved.

The F polymer is a thermally meltable polymer containing units (TFE units) based on tetrafluoroethylene (hereinafter referred to also as "TFE"). Therefore, the F layer is excellent in flexibility, and adhesiveness and bonding properties to the outer surface of the glass container. Here, the thermal meltability means a melt flowable polymer such that there exists a temperature where the melt flow rate becomes to be from 0.1 to 1000 g/10 minutes under a load of 49 N and at a temperature higher by at least 20° C. than the melting temperature of the polymer.

The melting temperature of the F polymer is more than 260° C. and preferably from 280 to 320° C. In such a case, the F layer tends to be excellent in heat resistance.

The fluorine atom content in the F polymer is preferably at least 70 mass % and more preferably from 74 to 76 mass %. In such a case, the UV durability of the F layer is more likely to be improved.

The glass transition temperature of the F polymer is preferably from 75 to 125° C. and more preferably from 80 to 100° C.

As the F polymer, a polymer containing TFE units and ethylene units, a polymer containing TFE units and propylene units, a polymer (PFA) containing TFE units and units (PAVE units) based on a perfluoro(alkyl vinyl ether) (hereinafter referred to also as "PAVE"), and a polymer containing TFE units and units based on a fluoroalkylethylene may be mentioned, and PFA is preferred. When PFA is used as the F polymer, the impact resistance of the present container is likely to be increased. Further, the above polymers may further contain units based on other comonomers.

As PAVE, $CF_2=CFOCF_3$, $CF_2=CFOCF_2CF_3$ and $CF_2=CFOCF_2CF_2CF_3$ (PPVE) are preferred, and PPVE is more preferred.

The F polymer has carbonyl group-containing groups or hydroxy group-containing groups (hereinafter these collectively referred to also as "oxygen-containing polar groups"). Since the F polymer has such oxygen-containing polar groups, the F layer adheres firmly to the outer surface of the glass container and also exhibits excellent high-temperature adhesion.

The oxygen-containing polar groups may be contained in units in the F polymer or in the terminal groups of the main chain of the F polymer. As the latter embodiment, a F polymer having oxygen-containing polar groups as terminal groups derived from polymerization initiators, chain transfer agents, etc., or a F polymer having oxygen-containing polar groups obtained by plasma treatment or ionizing ray treatment of the F polymer, may be mentioned.

The F polymer preferably has carbonyl group-containing groups. In such a case, adhesion and cohesion between the F layer and the outer surface of the glass container will be excellent.

As the hydroxy group-containing groups, groups containing alcoholic hydroxy groups are preferred, and $-CF_2CH_2OH$, $-C(CF_3)_2OH$ and 1,2-glycol groups ($-CH(OH)CH_2OH$) are more preferred.

The carbonyl group-containing groups are groups containing carbonyl groups ($>C(O)$). As the carbonyl group-containing groups, carboxy groups, alkoxycarbonyl groups, amide groups, isocyanate groups, carbamate groups ($-OC(O)NH_2$), acid anhydride residues ($-C(O)OC(O)-$), imide residues ($-C(O)NHC(O)-$, etc.) and carbonate groups ($-OC(O)O-$) are preferred, and acid anhydride residues are more preferred.

When the F polymer has carbonyl group-containing groups, the number of carbonyl group-containing groups in the F polymer is preferably from 10 to 5000, more preferably from 50 to 4000 and further preferably from 100 to 2000, per $1 \times 10^6$ carbon atoms in the main chain. In such a case, the adhesion of the F layer to the outer surface of the glass container is more likely to be increased. Here, the number of carbonyl group-containing groups in the F polymer can be quantified by the composition of the polymer or by the method described in WO2020/145133.

As the F polymer, a polymer containing TFE units and PAVE units and having oxygen-containing polar groups, is preferred, a polymer containing TFE units, PAVE units and units based on a monomer having an oxygen-containing polar group, is more preferred, and a polymer containing these units in this order in amounts of from 90 to 99 mol %, from 0.5 to 9.97 mol % and from 0.01 to 3 mol %, to all units, is further preferred.

Further, as the monomer having an oxygen-containing polar group, itaconic anhydride, citraconic anhydride, and 5-norbornene-2,3-dicarboxylic anhydride (hereinafter referred to also as "NAH") are preferred.

As specific examples of such polymers, those disclosed in WO2018/16644 may be mentioned.

The above F polymer tends to be more densely and homogeneously distributed in the F layer. Further, microspheres tend to be easily formed in the F layer, and adhesion with other components is likely to be increased. As a result, it will be easier to obtain a F layer having high adhesiveness to the outer surface of the glass container.

The compressive strength of the F polymer is a value measured by ASTM-D695. Specifically, the compressive strength of the F polymer is preferably more than 12 MPa and more preferably at least 15 MPa. The compressive strength of the F polymer is preferably at most 40 MPa. In such a case, the high-temperature adhesion of the F layer tends to be easily improved.

The light transmittance of the F layer at a wavelength of from 255 to 355 nm is preferably at least 80%. In such a case, visibility of the content (e.g. a pharmaceutical product) contained in the present container from outside will be excellent. In the present container with such excellent visibility, the F layer is preferably composed mainly of a F polymer, and is preferably composed substantially exclusively of the F polymer. The F layer being composed substantially exclusively of the F polymer means that the content of the F polymer in the F layer is at least 90 mass %.

Further, the peel strength between the glass container and the F layer is preferably at least 5 N/cm and more preferably at least 8 N/cm. This prevents the F layer from peeling off easily from the glass container.

The thickness of the F layer is more than 1 μm and preferably more than 20 μm. Further, the thickness of the F layer is preferably less than 40 μm. The present container provided with an F layer of such a thickness is more likely to have improved impact resistance, heat resistance and UV resistance.

The porosity of the F layer is preferably at most 5% and more preferably at most 4%. The porosity of the F layer is preferably at least 0.01% and more preferably at least 0.1%.

The porosity of the F layer is the ratio (%) obtained by dividing the area occupied by the porosity by the area of the F layer, by judging the porosity of the F layer by image treatment from the SEM photograph of the cross section of the F layer observed by using a scanning electron microscope (SEM).

Here, the area occupied by the porosity is determined by approximating the porosity as a circle.

Further, the F layer may contain a resin material other than the F polymer, which will be described later in the method for producing the present container, and it is preferred to contain polytetrafluoroethylene (PTFE). The present container in which the F polymer and PTFE are contained in the F layer, is excellent in low frictional properties and not only can suppress adhesion of foreign matters but also tends to be more easily improve the handling efficiency such as transportation. Further, it is easier to increase the resistance (heat resistance and UV resistance) of the F layer to sterilization treatment.

When the F polymer and PTFE are contained in the F layer, the content of the F polymer and the content of PTFE in the F layer are each independently preferably from 10 to 90 mass %. Further, the mass ratio of the content of PTFE to the content of the F polymer in the F layer is preferably at least 1. The above mass ratio is preferably at most 20 and more preferably at most 10.

Here, PTFE refers to a non-thermally meltable tetrafluoroethylene type polymer having TFE units as the main units, and a homopolymer of TFE and a copolymer of TFE and a very small amount of a comonomer (HFP, PAVE, FAE, etc.) may be mentioned.

The glass container is not particularly limited in its application, but may be suitably used as a container for storing a pharmaceutical product. As such a container, a vial, an ampule, a bottle, a cartridge, a syringe (outer tube and plunger), a beaker, a petri dish, etc. may be mentioned, and a vial, an ampule, a bottle or a cartridge is preferred.

Since the glass container can be chemically strengthened prior to the formation of the F layer, this can be utilized to improve the mechanical durability of the glass container. Therefore, the glass container can also be ion-exchange strengthened prior to the formation of the F layer. The glass in this case is referred to also as "ion-exchange glass". A specific example of ion-exchange strengthening of a glass container may be an embodiment of immersing the glass container in a 100% $KNO_3$ molten salt bath at 450° C. for about 8 hours. Further, the glass container may be strengthened by other strengthening methods such as heat strengthening, flame polishing, etc.

Further, the glass container can also be formed from a glass composition containing ion-exchangeable glass and non-ion-exchangeable glass, and may be formed from a Type 1B glass composition such as Schott Type 1B aluminosilicate glass.

The glass container is preferably formed from glass which meets the standards for pharmaceutical glass listed in regulatory bodies such as the U.S. Pharmacopoeia, European Pharmacopoeia, and Japanese Pharmacopoeia based on hydrolysis resistance.

The glass to constitute the glass container preferably consists of soda lime glass, alkali aluminosilicate glass or borosilicate glass, and alkali aluminosilicate glass or borosilicate glass is more preferred. These glasses are preferred because of their low coefficient of linear expansion, high thermal shock resistance and excellent chemical resistance.

Further, the glass preferably has a coefficient of linear thermal expansion (CTE) of from $25 \times 10^{-7}$ to $80 \times 10^{-7}/°$ C.

The compressive stress of the glass container is preferably at least 300 MPa and more preferably at least 350 MPa. The compressive stress of the glass container is preferably at most 900 MPa.

The thickness (wall thickness) of the glass container is preferably at least 50 μm and more preferably at least 100 μm. The thickness of the glass container is preferably at most 2 mm and more preferably at most 1 mm. Since the present container has an F layer, even a glass container with a relatively small thickness can exhibit high impact resistance.

Alkali aluminosilicate glass generally contains $Na_2O$ and/or $K_2O$ and $SiO_2$ and $Al_2O_3$ and contains, as optional components, at least one alkaline earth metal oxide and at least one alkali metal oxide.

Alkali aluminosilicate glass preferably does not contain boron and boron-containing compounds.

Alkali aluminosilicate glass may contain trace amounts of at least one additional oxide selected from the group consisting of $SnO_2$, $ZrO_2$, $ZnO$, $TiO_2$ and $As_2O_3$. These components are added as clearing agents and/or chemical durability enhancers.

Further, on the outer surface of the glass container, a coating film containing $SnO_2$, $ZrO_2$, $ZnO$, $TiO_2$, $As_2O_3$, etc. may be formed.

As specific examples of borosilicate glass, Corning (registered trademark) Pyrex (registered trademark) 7740, 7800 and Wheaton 180, 200, 400, Schott Duran, Schott Fiolax, KIMAX (registered trademark) N-51A, Gerrescheimer GX-51 Flint, etc. may be mentioned.

As specific examples of soda lime glass, Wheaton 800 and 900 may be mentioned. Further, as soda lime glass, ammonium sulfate-treated soda lime glass may be used.

The method for producing a reinforced glass container of the present invention (hereinafter referred to also as "the present method") is a method of applying a liquid composition containing particles of the F polymer (hereinafter referred to also as "F particles") to the outer surface of the glass container, followed by heating to form an F layer containing the F polymer and having a thickness of more than 1 μm, on the outer surface of the glass container, to obtain the present container.

The obtainable present container is excellent in impact resistance, heat resistance and UV resistance for the reasons as described above.

In the present method, it is preferred to apply said liquid composition directly to the outer surface of the glass container. In other words, in the present method, it is preferred to apply said liquid composition to the outer surface of the glass container and heat it to directly form the F layer on the outer surface of the glass container. In such a case, for the reasons as mentioned above, the impact resistance, heat resistance and UV resistance of the obtainable present container are likely to be further improved.

In the liquid composition, D50 of the F particles is preferably at most 10 μm and more preferably at most 5 μm. D50 of the F particles is preferably at least 0.1 μm, and more preferably at least 1 μm. In this range of D50, the flowability and dispersibility of the F particles tend to be good.

The specific surface area of the F particles is preferably from 1 to 25 $m^2/g$ and more preferably from 1 to 8 $m^2/g$.

The F particles may contain a resin or an inorganic material other than the F polymer, but preferably contain the F polymer as the main component. The content of the F polymer in the F particles, is preferably at least 80 mass % and more preferably 100 mass %.

As the above resin, a heat-resistant resin such as an aromatic polyester, a polyamide-imide, a (thermoplastic) polyimide, a polyphenylene ether, a polyphenylene oxide or a maleimide, may be mentioned. As the inorganic filler, silicon oxide (silica), a metal oxide (beryllium oxide, cerium oxide, alumina, soda alumina, magnesium oxide, zinc oxide, titanium oxide, etc.), boron nitride or magnesium metasilicate (steatite) may be mentioned. The inorganic filler may be such that at least part of its surface is treated with a silane coupling agent (3-aminopropyltriethoxysilane, vinyltrimethoxysilane, 3-mercaptopropyltrimethoxysilane, 3-glycidoxypropylmethyldiethoxysilane, 3-methacryloxypropyltriethoxysilane, 3-isocyanatepropyltriethoxysilane, etc.).

The F particles containing a resin or an inorganic material other than the F polymer may have a core-shell structure having the F polymer as the core and the above component as the shell, or a core-shell structure having the F polymer as the shell and the above component as the core. Such F particles are obtainable, for example, by coalescence (collision, agglomeration, etc.) of particles of the F polymer and particles of the above component.

The liquid composition may contain an inorganic filler in addition to the F particles. When the liquid composition contains an inorganic filler, it will be easier to form an F layer excellent in low linear expansion.

As the inorganic filler, silicon oxide (silica), a metal oxide (beryllium oxide, cerium oxide, alumina, soda alumina, magnesium oxide, zinc oxide, titanium oxide, etc.), boron nitride or magnesium metasilicate (steatite) may be mentioned.

D50 of the inorganic filler is preferably from 0.01 to 20 µm.

The shape of the inorganic filler may be any of granular, needle (fibrous) or plate-like. As specific shapes of the inorganic filler, spherical, scaly, layered, leafy, apricot, columnar, chicken-crown, equiaxial, foliate, mica, blocky, flat, wedge-shaped, rosette-shaped, reticulate and prismatic may be mentioned.

When the liquid composition contains an inorganic filler, the amount of the inorganic filler is preferably from 1 to 50 mass % and more preferably from 5 to 40 mass %, to the entire liquid composition.

The liquid composition may further contain a resin material other than the F particles (F polymer) from the viewpoint of improving the adhesion and low linear expansion of the F layer.

Such a resin material may be thermosetting or thermoplastic. Further, the resin material may be modified.

Further, the resin material may be dissolved in the liquid composition or may be dispersed as particles without being dissolved in the liquid composition.

As such a resin material, a tetrafluoroethylene type polymer other than the F polymer, an aromatic polyimide, an aromatic polyamic acid as an aromatic polyimide precursor, an aromatic maleimide, an acrylic resin, a phenolic resin, a liquid crystalline polyester, a liquid crystalline polyesteramide, a polyolefin resin, a modified polyphenylene ether, a polyfunctional cyanate resin, a polyfunctional maleimide-cyanate resin, a polyfunctional maleimide, an aromatic elastomer such as styrene elastomer, a vinylester resin, an urea resin, a diallylphthalate resin, a melamine resin, a guanamine resin, a melamine-urea copolymerization resin, polycarbonate, polyarylate, polysulfone, polyarylsulfone, an aromatic polyamide, an aromatic polyetheramide, polyphenylene sulfide, polyaryletherketone, polyamideimide, polyphenylene ether, an epoxy resin, etc. may be mentioned.

As the tetrafluoroethylene type polymer other than the F polymer, PTFE is preferred as described above. When the liquid composition contains particles of PTFE, D50 thereof is preferably from 0.1 to 6 µm. Further, when the liquid composition contains particles of PTFE, the amount thereof is preferably from 10 to 50 mass % to the entire liquid composition.

When the liquid composition contains a resin material other than PTFE, the amount thereof is preferably at most 40 mass % to the entire liquid composition.

In addition to the above components, the liquid composition may further contain other components such as a thixotropic agent, a viscosity regulator, a defoamer, a silane coupling agent, a dehydrating agent, a plasticizer, a weathering agent, an antioxidant, a heat stabilizer, a lubricant, an antistatic agent, a brightening agent, a coloring agent, a conductive agent, a mold release agent, a surface treatment agent and a flame retardant.

The liquid composition preferably contains a liquid dispersant. The liquid dispersant is a liquid having a function to disperse or dissolve the components of the liquid composition and is an inert liquid compound at 25° C.

The liquid dispersant may be water or a non-aqueous liquid dispersant.

As the liquid dispersant, a liquid compound selected from the group consisting of water, amides, ketones and esters is preferred from the viewpoint of enhancing the dispersion stability of each component in the liquid composition, and water, N-methyl-2-pyrrolidone, γ-butyrolactone, methyl ethyl ketone, cyclohexanone and cyclopentanone are more preferred.

As the liquid dispersant, two or more types may be used in combination, and in such a case, the different liquid dispersants should better be compatible.

The boiling point of the liquid dispersant is preferably from 125 to 250° C. In this range, when the liquid dispersant is removed from the liquid composition, the F particles tend to flow highly and pack densely, resulting in the formation of a dense F layer.

The content of the liquid dispersant in the liquid composition is preferably from 40 to 80 mass % and more preferably from 50 to 70 mass %.

The liquid composition may contain a nonionic surfactant from the viewpoint of improving dispersion stability and handling efficiency.

As specific examples of such a surfactant, the Ftergent series (manufactured by Neos Company Limited; Ftergent is a registered trademark), the Surflon series (manufactured by AGC Seimi Chemical Co., Ltd.; Surflon is a registered trademark), the Megafac series (manufactured by DIC Corporation; Megafac is a registered trademark), the Unidyne series (manufactured by Daikin Industries Ltd.; Unidyne is a registered trademark), "BYK-347", "BYK-349", "BYK-378", "BYK-3450", "BYK-3451", "BYK-3455", "BYK-3456" (manufactured by BYK-Chemie Japan), "KF-6011", "KF-6043" (manufactured by Shin-Etsu Chemical Co., Ltd.) may be mentioned.

The viscosity of the liquid composition is preferably at least 10 mPa·s and more preferably at least 20 mPa·s. The viscosity of the liquid composition is preferably at most 1000 mPa·s, more preferably at most 500 mPa·s and further preferably at most 100 mPa·s.

The thixotropic ratio of the liquid composition is preferably at least 1.0. The thixotropic ratio of the liquid composition is preferably at most 3.0 and more preferably at most 2.0.

In such a case, the liquid composition having the above characteristics will be excellent in coatability (especially coatability by the dip coating method) and homogeneity, and will be more likely to form a denser F layer.

As the method for applying the liquid composition to the outer surface of the glass container, a coating method such as a dip coating method, a spray method (a spray method using a spray gun), a roll coating method, a spin coating method, a gravure coating method, a micro-gravure coating method, a gravure offset method, a knife coating method, a kiss coating method, a bar coating method, a die coating method, a fountain-mayer bar method or a slot die coating method may be mentioned, and a dip coating method is especially preferred. According to the dip coating method, it is possible to more easily form the F layer on the outer surface of the glass container.

It is preferred that the liquid composition applied to the outer surface of the glass container is heated to remove (dry) the liquid dispersant to obtain a dry film, and then the dry film (F polymer) is calcined by further heating to form the F layer.

The heating temperature for removing the liquid dispersant is preferably a temperature lower by from 0 to 150° C. than the boiling point of the liquid dispersant. For example, when using N-methyl-2-pyrrolidone (NMP), which has a boiling point of about 200° C., the heating temperature is preferably at most 150° C. and more preferably from 100 to 120° C.

Further, at the time of removing the liquid dispersant, air-drying may be employed.

After removing the liquid dispersant, it is preferred to heat the F polymer at the temperature at which it is calcined, and it is more preferred to heat it at a temperature of from 300 to 400° C.

For the F layer, the process of applying and drying the liquid composition may be conducted only once or at least twice. For example, the liquid composition may be applied and dried to obtain a dry film; on the dry film, the liquid composition is further applied and dried to obtain a thick dry film; and the dry film (the F polymer) is calcined by heating to form the F layer.

The method for producing a pharmaceutical container of the present invention is a method of exposing the present container to an atmosphere at a temperature of at least 200° C. and at most the melting temperature of the F polymer (high-temperature atmosphere) or ultraviolet light, to obtain a sterilized present container, and filling into the present container, a pharmaceutical product, followed by sealing to obtain a pharmaceutical container such that the pharmaceutical product is contained in the present container.

The specific temperature of the high-temperature atmosphere is preferably from 250 to 300° C.

The time to expose the present container to the high-temperature atmosphere is preferably from 0.5 to 12 hours and preferably from 1 to 6 hours.

On the other hand, the wavelength of the ultraviolet light to be irradiated is preferably from 240 to 290 nm.

The integrated dose of ultraviolet irradiation is preferably from 1 to 200 mJ/cm$^2$.

Here, the pharmaceutical products to be stored in the present container may be chemical substances themselves which may be used for the diagnosis, treatment, cure or prevention of diseases, and compositions containing at least one type of such chemical substances. Further, the form of the pharmaceutical product may be any form such as liquid, solid, gel, suspension, emulsion or powder.

In the foregoing, the reinforced glass container, the method for producing a pharmaceutical container, and the method for producing a reinforced glass container, of the present invention have been described, but the present invention is not limited to the constructions of the above-described embodiments.

For example, the reinforced glass container of the present invention may have any other optional construction added to the construction of the above embodiment, or may be substituted with any other optional construction which performs a similar function.

Further, the method for producing a pharmaceutical container and the method for producing a reinforced glass container, of the present invention, may have a step of any other optional purpose in the construction of the above embodiments, respectively, or may be substituted with any other optional step which performs a similar function.

EXAMPLES

In the following, the present invention will be described in detail with reference to Examples, but the present invention is not limited to these Examples.

1. Details of the Respective Components
[Particles]

F particles 1: Particles (D50: 2.1 μm) composed of a polymer (melt temperature: 300° C., compressive strength: 15 MPa) containing TFE units, NAH units and PPVE units in amounts of 97.9 mol %, 0.1 mol % and 2.0 mol %, in this order, and having 1000 carbonyl group-containing groups per 1×10$^6$ carbon atoms in the main chain.

F particles 2: Particles (D50: 2.3 μm) composed of a polymer (melt temperature: 255° C., compressive strength: 10 MPa) containing TFE units and units based on hexafluoropropylene in amounts of 75 mol % and 25 mol %, in this order, to all units.

[Glass Container]

Glass container 1: Vial made of borosilicate glass (thickness: 2 mm)

2. Example for Production of Liquid Composition

Into a pot, a powder composed of F particles 1, a nonionic silicone surfactant (manufactured by BYK; product name: BYK-3450), a pH buffer and water were put, and zirconia balls were put. Then, the pot was rolled at 150 rpm for 1 hour to obtain a liquid composition 1 (viscosity: 30 mPa·s, pH: 8 to 9) containing F particles 1 (40 mass parts), the silicone surfactant (2 mass parts), the pH buffer (2 mass parts) and water (56 mass parts).

Liquid composition 2 (viscosity: 20 mPa·s, pH: 9) was obtained in the same manner as liquid composition 1, except that the powder composed of F particles 1 was replaced with a powder composed of F particles 2.

Further, a commercially available aqueous dispersion of PTFE (manufactured by AGC Inc., product name: AD-915E) containing 60 mass % of non-thermally meltable PTFE particles (D50: 0.3 μm), was used as liquid composition 3.

Furthermore, the powder composed of F particles 1, a silicone surfactant and liquid composition 3 were mixed to obtain liquid composition 4 (viscosity: 50 mPa·s) containing PTFE particles (50 mass parts), F particles 1 (5 mass parts), the silicone surfactant (0.25 mass parts) and water (44.75 mass parts). The pH of liquid composition 4 was adjusted to 10 by adding an appropriate amount of ammonia water.

3. Example for Production of Reinforced Glass Container

By a dip coating method in which the glass container 1 was dipped into the liquid composition 1, a liquid film was formed on the outer surface of the glass container 1. Then, the glass container 1 having the liquid film formed was passed through a drying oven at 120° C. for 5 minutes to dry it by heating to obtain a dried film.

Thereafter, the dried film was heated in a nitrogen oven at 380° C. for 3 minutes. This resulted in a reinforced glass container 1 having a glass container 1 and an F layer (thickness: 25 μm) containing melt-calcined F particles 1 on its outer surface.

Reinforced glass containers 2 to 4 were obtained in the same manner as reinforced glass container 1, except that each of liquid compositions 2 to 4 was used instead of liquid composition 1.

Here, the F layer of each of the reinforced glass containers 1 to 4 had a light transmittance of at least 80% at the wavelength of from 255 to 355 nm.

Glass container 1 was immersed in a solution containing 0.1 mass % of aminopropylsilsesquioxane to form a liquid film on its outer surface. Then, the glass container 1 having this liquid film formed was heated in a convection oven at 100° C. for 15 minutes to form the primer layer.

Then, the glass container 1 having the primer layer was immersed in the liquid composition 3 to form a liquid film on the primer layer. Then, the glass container 1 having the liquid film formed was passed through a drying oven at 120° C. for 5 minutes to dry it by heating to obtain a dried film.

Thereafter, the dried film was heated in a nitrogen oven at 380° C. for 3 minutes. Thus, an F layer (thickness: 25 μm) containing the melt-calcined product of F particles 1 was formed, and a reinforced glass container 5 having a glass container 1, and the primer layer and the F layer in this order on its outer surface, was obtained.

4. Evaluations 4-1. Adhesion

At the time when in the F layer in each of reinforced glass containers 1 to 5, a strip cut line was imparted, and the F layer was peeled off at 90° from one end of the strip in the longitudinal direction at a tensile speed of 50 mm/min using a tensile tester, the maximum load was defined as peel strength (N/cm), and was evaluated in accordance with the following standards.

[Evaluation standards]
○: Peel strength is at least 8 N/cm.
Δ: Peel strength is at least 5 N/cm and less than 8 N/cm.
×: Peel strength is less than 5 N/cm.

4-2. Heat Resistance

After heating the reinforced glass containers 1 to 5 in an oven at 260° C. for 1 hour, the appearance of the F layer was visually observed and evaluated in accordance with the following standards. Here, reinforced glass container 3 was not evaluated because the adhesion of the F layer was insufficient.

[Evaluation Standards]
○: The entire F layer is in close contact with the glass container 1.
×: The F layer is detached from the glass container 1.

4-3. UV Resistance

The appearance of the F layer was visually observed after irradiating reinforced glass containers 1 to 5 with ultraviolet rays with a wavelength of 270 nm for 1 hour, and was evaluated in accordance with the following standards. Here, reinforced glass container 3 was not evaluated because the adhesion of the F layer was insufficient.

[Evaluation Standards]
○: The F layer is not deteriorated and the surface is smooth.
×: The F layer is deteriorated and the surface is not smooth.

The results of the respective evaluations are summarized in the following Table 1.

TABLE 1

|  | Number of reinforced glass container | | | | |
| --- | --- | --- | --- | --- | --- |
|  | 1 | 2 | 3 | 4 | 5 |
| Adhesion | ○ | Δ | X | ○ | Δ |
| Heat resistance | ○ | X | — | ○ | X |
| UV resistance | ○ | ○ | — | ○ | X |

The reinforced glass container 1 had the highest transparency of the F layer formed on the container surface and the highest internal visibility. Further, the reinforced glass container 4 had the lowest friction of the F layer formed on the container surface, low foreign matter adhesion, and excellent transportability.

INDUSTRIAL APPLICABILITY

The reinforced glass container of the present invention is excellent in impact resistance, heat resistance and UV resistance, and thus is useful as a container for storing a pharmaceutical product, etc. which require a high level of hygiene management.

This application is a continuation of PCT Application No. PCT/JP2021/048886, filed on Dec. 28, 2021, which is based upon and claims the benefit of priority from Japanese Patent Application No. 2021-002416 filed on Jan. 8, 2021. The contents of those applications are incorporated herein by reference in their entireties.

What is claimed is:

1. A reinforced glass container, comprising:
a glass container and
a polymer layer provided directly on an outer surface of the glass container and having a thickness of more than 1 μm,
wherein
the polymer layer contains a tetrafluoroethylene type polymer as the only resin material contained therein, and
the tetrafluoroethylene type polymer
has a melting temperature of more than 260° C. measured by DSC,
has a compressive strength of more than 12 MPa to at most 40 MPa measured by ASTM-D695,
contains carbonyl group-containing groups or hydroxy group-containing groups,
contains units based on a perfluoro (alkyl vinyl ether) other than $CF_2=CFOCF_3$ and $CF_2=CFOCF_2CF_3$, and
does not contain units based on $CF_2CFOCF_3$ or $CF_2=CFOCF_2CF_3$.

2. The reinforced glass container according to claim 1, wherein the tetrafluoroethylene type polymer has a main chain containing from 10 to 5000 carbonyl group-containing groups per $1 \times 10^6$ carbon atoms in the main chain.

3. The reinforced glass container according to claim 1, wherein the glass container is made of borosilicate glass or alkali aluminosilicate glass.

4. The reinforced glass container according to claim 1, wherein the glass container has a thickness of at most 2 mm.

5. The reinforced glass container according to claim 1, wherein the thickness of the polymer layer is more than 20 μm.

6. The reinforced glass container according to claim 1, wherein the thickness of the polymer layer is less than 40 μm.

7. The reinforced glass container according to claim 1, wherein the glass container is a vial, an ampoule, a bottle or a cartridge.

8. The reinforced glass container according to claim 1, which is for pharmaceutical products.

9. The reinforced glass container according to claim 1, wherein the tetrafluoroethylene type polymer contains units based on $CF_2=CFOCF_2CF_2CF_3$.

10. A method of producing a pharmaceutical container, the method comprising:
exposing the reinforced glass container according to claim 1 to ultraviolet light or an atmosphere at a temperature of at least 200° C. and below the melting temperature of the tetrafluoroethylene type polymer, to obtain a sterilized reinforced glass container, and
filling the sterilized reinforced glass container with a pharmaceutical product, followed by sealing to obtain the pharmaceutical container having the pharmaceutical product stored therein.

11. A method for producing the reinforced glass container according to claim 1, the method comprising:
applying a liquid composition containing particles of the tetrafluoroethylene type polymer directly to the outer surface of the glass container, and subsequently heating the liquid composition to form the polymer layer, thereby obtaining the reinforced glass container.

12. The method according to claim 11, wherein the liquid composition is applied to the outer surface of the glass container by a dip coating method.

13. The method according to claim 11, wherein the liquid composition has a viscosity of at most 1000 mPa·s.

\* \* \* \* \*